(12) United States Patent
Schaffner

(10) Patent No.: US 12,179,418 B2
(45) Date of Patent: Dec. 31, 2024

(54) SILOXANE ADDITIVE MANUFACTURING COMPOSITION

(71) Applicant: SPECTROPLAST AG, Schlieren (CH)

(72) Inventor: Manuel Schaffner, Affoltern am Albis (CH)

(73) Assignee: SPECTROPLAST AG, Schlieren (CH)

( * ) Notice: Subject to any disclaimer, the term of this patent is extended or adjusted under 35 U.S.C. 154(b) by 342 days.

(21) Appl. No.: 17/438,084

(22) PCT Filed: Mar. 17, 2020

(86) PCT No.: PCT/EP2020/057238
§ 371 (c)(1),
(2) Date: Sep. 10, 2021

(87) PCT Pub. No.: WO2020/187891
PCT Pub. Date: Sep. 24, 2020

(65) Prior Publication Data
US 2022/0184885 A1    Jun. 16, 2022

(30) Foreign Application Priority Data
Mar. 20, 2019    (CH) .................................... 00361/19

(51) Int. Cl.
*B29C 64/129*    (2017.01)
*B29C 64/245*    (2017.01)
(Continued)

(52) U.S. Cl.
CPC .......... *B29C 64/129* (2017.08); *B29C 64/245* (2017.08); *B29C 64/286* (2017.08);
(Continued)

(58) Field of Classification Search
CPC . B29C 48/297; B29C 48/278; B29C 65/4865; B29C 64/393; B29C 64/386;
(Continued)

(56) References Cited

U.S. PATENT DOCUMENTS

| 5,302,627 A | 4/1994 | Field et al. |
| 2007/0049652 A1 | 3/2007 | Ito et al. |

(Continued)

FOREIGN PATENT DOCUMENTS

| CN | 105683258 A | 6/2016 |
| CN | 106804110 A | 6/2017 |

(Continued)

OTHER PUBLICATIONS

Chinese Patent Office (CNIPA), Beijing, P.R. China, First Office Action for Chinese Application No. 202080021572.1, issued Sep. 1, 2022 (14 pages).

(Continued)

*Primary Examiner* — Stella K Yi
(74) *Attorney, Agent, or Firm* — Pauley Erickson & Swanson

(57) ABSTRACT

Additive manufacturing compositions are disclosed that include at least one alkenyl-derivatized polysiloxane and at least one mercapto-derivatized polysiloxane crosslinking agent of formula (I): $R^1(R)_2SiO((R^3R^4)SiO)_xSi(R)_2R^2$ (I), wherein R is independently C(1-12)alkyl; $R^1, R^2, R^3, R^4$ are independently C(1-12)alkyl, or mercapto-C(1-12)alkyl; x is 1 or more; with the proviso that at least one of $R^1, R^2, R^3, R^4$ is mercapto-C(1-12)alkyl, and wherein the at least one alkenyl-derivatized polysiloxane and the at least one mercapto-derivatized polysiloxane crosslinking agent form a stable emulsion; their use in additive manufacturing as well as 3D printed silicone objects obtained from these compositions.

37 Claims, 5 Drawing Sheets

(51) Int. Cl.
  *B29C 64/286* (2017.01)
  *B33Y 10/00* (2015.01)
  *B33Y 30/00* (2015.01)
  *B33Y 70/00* (2020.01)
  *B33Y 80/00* (2015.01)
  *C08G 77/20* (2006.01)
  *C08G 77/28* (2006.01)

(52) U.S. Cl.
  CPC .............. *C08G 77/20* (2013.01); *C08G 77/28* (2013.01); *B33Y 10/00* (2014.12); *B33Y 30/00* (2014.12); *B33Y 70/00* (2014.12); *B33Y 80/00* (2014.12)

(58) Field of Classification Search
  CPC ... B29C 64/379; B29C 64/307; B29C 64/286; B29C 64/245; B29C 64/129; C08G 77/28; C08G 77/20
  See application file for complete search history.

(56) References Cited

U.S. PATENT DOCUMENTS

| | | | |
|---|---|---|---|
| 2018/0148380 | A1 | 5/2018 | Eckel et al. |
| 2019/0002353 | A1 | 1/2019 | Eckel et al. |

FOREIGN PATENT DOCUMENTS

| | | |
|---|---|---|
| EP | 0 437 247 A2 | 7/1991 |
| EP | 1 757 979 A1 | 2/2007 |
| JP | 2006-2087 A | 1/2006 |
| JP | 2010-0185991 A | 5/2012 |
| JP | 2015-193820 A | 11/2015 |
| WO | WO 2013/180252 A2 | 10/2013 |
| WO | WO 2015/148318 A1 | 10/2015 |
| WO | WO 2016/044547 A1 | 3/2016 |
| WO | WO 2018/026829 A1 | 2/2018 |
| WO | WO2019/025717 A | 2/2019 |

OTHER PUBLICATIONS

Nguyen, K. D.Q., et al. "Ultrafast Diffusion-Controlled Thiol-Ene Based Crosslinking of Silicone Elastomers with Tailored Mechanical Properties for Biomedical Applications," Polym. Chem, 2016, 7, pp. 5281-5293—Author Version.

EPO (Riswijk, NL), English language version of the International Search Report, Form PCT/ISA/210, for International Application PCT/EP2020/057238, Apr. 24, 2020 (3 pages).

Japanese Patent Office (JPO), Office Action for Japanese Patent Application No. 2021-555413, dated Feb. 6, 2024 (18 pages).

Japanese Patent Office (JPO), Office Action for Japanese Application No. 2021-555413, dated Feb. 6, 2024, in Japanese language (9 pages).

SILOXANE ADDITIVE MANUFACTURING COMPOSITION

CROSS REFERENCE TO RELATED APPLICATIONS

This application is a National Phase filing in the United States, under 35 USC § 371, of PCT International Patent Application PCT/EP2020/057238, filed on 17 Mar. 2020 which claims the priority of Swiss Patent Application CH 00361/19, filed 20 Mar. 2019. These applications are hereby incorporated by reference herein in their entirety and is made a part hereof, including but not limited to those portions which specifically appear hereinafter.

BACKGROUND OF THE INVENTION

Field of the Invention

The present invention relates to additive manufacturing compositions comprising at least one alkenyl-derivatized polysiloxane and at least one mercapto-derivatized polysiloxane crosslinking agent and wherein the at least one alkenyl-derivatized polysiloxane and the at least one mercapto-derivatized polysiloxane crosslinking agent form a stable emulsion; their use in additive manufacturing as well as 3-dimensionally (3D) printed silicone objects obtained by using these compositions.

Discussion of Related Art

Additive manufacturing, also widely known as 3D printing, refers to processes used to create a three-dimensional object by either depositing and solidifying material of various forms (e.g., layer, droplet, etc.) to obtain the entire object in a layer-by-layer or continuous fashion or solidifying the entire volume at the same time to obtain the entire object in full as one part.

A large number of materials, ranging from metals to synthetic resins are available today for additive manufacturing. In one type of additive manufacturing, a layer of a liquid crosslinkable material is deposited according to a predetermined pattern using an apparatus equipped with a nozzle. Examples of such a type of additive manufacturing are 3D printing of elastomers and hydrogels, both of which need to be crosslinked. After deposition of a layer of crosslinkable material (either as one layer or as drops forming a layer), the crosslinkable material is crosslinked by either exposing it for example to radiation, a change in temperature or by contacting it with a chemical crosslinking agent to obtain a self-supporting structure onto which further layers can then be deposited and crosslinked. Alternatively, an object may integrally be formed from the crosslinkable material in a first step and integrally crosslinked in a subsequent step.

Polysiloxanes, also known as silicones, have so far not been extensively used in the field of additive manufacturing due to several problems inherent to this class of chemical compounds. On one hand, polysiloxanes exhibit high viscosities that make it difficult to accurately dose polysiloxanes and on the other hand polysiloxanes exhibit rather poor viscoelastic properties that make it difficult to provide inks that retain shape after deposition (e.g., that do not flow or bleed). The above issues are exacerbated by the fact that most of the crosslinking chemistries that can be used to crosslink polysiloxanes either employ (toxic) (organo)-metal catalysis and/or require impractical crosslinking times (reducing attractiveness versus molding) and/or require high temperatures (requiring extra heating devices).

It is thus desirable to provide an alternative type of silicone-based inks that can be more conveniently used in the context of additive manufacturing by a reduced curing time and whose crosslinked products are free from (toxic) catalyst residues.

EP 0 437 247 A2 discloses UV curable silicone resin-organic mercaptan compositions, in which a polysiloxane functionalized with at least two aliphatic unsaturated radicals which can react with a mercaptan having two or more mercapto groups as well as a free radical photoinitiator and a free radical inhibitor. The composition is formed by mixing the components of the composition to a transparent compatible mixture and is then cast into different substrates to form a coating.

JP 20100185991 A discloses crosslinkable compositions for the manufacturing of microlenses comprising a polysiloxane having an unsaturated bond group, a polysiloxane different from the aforementioned polysiloxane, a mercapto compound, a photoinitiator and an organic solvent for the dissolution of the aforementioned compounds. The composition is applied as film coating to a substrate and crosslinked using radiation and heat.

U.S. Pat. No. 5,302,627 B discloses a UV crosslinkable composition useful as protective coating in the electronics industry. The composition comprises an alkenyl-containing polymethylsiloxane, a mercaptoalkyl-containing compound such as glycol dimercaptoacetate, a photoinitiator such as benzophenone as well as dye that indicates the degree of crosslinking via a color change.

JP 2015193820 A discloses a curable resin composition containing a modified silicone compound having two or more alkenyl groups, a polythiol compound, having two or more thiol groups as well as a free radical photoinitiator for coating touchscreens with a protective layer.

WO 2013/160252 A2 discloses compositions to form dry silicone gels that can act as crosslinker/chain extender having 2 or more thiol groups, a free radical initiator and a toughening agent such as fumed silica. The compositions can be crosslinked with UV radiation or heat.

Nguyen et al., discloses a composition in which a vinyl-polysiloxane and a thiol-polysiloxane can be crosslinked via UV radiation. Coatings of said composition were cast on cover slips to allow for further characterization of the coatings (Khai D. Q. Nguyen, et al., Polym. Chem., 2016,7, 5281-5293).

JP 2010-185991 A discloses low viscosity compositions for UV-curable thin films for use in the field of fiber optics, which compositions include a polysiloxane resin functionalized with aliphatic unsaturated groups and an organic mercaptan as crosslinker.

WO 2016/044547 A1 discloses a photocurable silicone composition for use in 3d printing. The composition includes a blend of at least a polysiloxane resin functionalized with aliphatic unsaturated groups and a polysiloxane resin functionalized with thiol groups as crosslinker.

WO 2018/026829 discloses polymer compositions including a siloxane polymer component having a plurality of vinyl groups and a siloxane polymer component having a plurality of thiol groups for use in bottom-up 3D printers to form elastomeric 3D structures.

Applicants have now observed that the above problems can be overcome by providing an additive manufacturing composition comprising at least one alkenyl-derivatized polysiloxane and at least one mercapto-derivatized polysiloxane as crosslinking agent, which composition can be used as-is in conventional additive manufacturing apparatuses because of its excellent rheological properties, both at rest and under shear. The rheological properties are achieved by the formation of a stable emulsion of the at least one mercapto-derivatized polysiloxane crosslinking agent and the at least one alkenyl-derivatized polysiloxane such that polymerisation starts in a controlled way at the droplet interface or in the continuous phase of the emulsion to give products with excellent optical and mechanical properties.

SUMMARY OF THE INVENTION

It is an object of the present invention to provide an additive manufacturing composition comprising at least one alkenyl-derivatized polysiloxane and at least one mercapto-derivatized polysiloxane-based crosslinking agent of formula (I): $R^1(R)_2SiO((R^3R^4)SiO)_xSi(R)_2R^2$ (I), wherein R is independently C(1-12)alkyl, preferably methyl; $R^1$, $R^2$, $R^3$, $R^4$ are independently C(1-12)alkyl, preferably methyl, or mercapto-C(1-12)alkyl; x is 1 or more, preferably 1 to 1,000,000; with the proviso that at least one of $R^1$, $R^2$, $R^3$, $R^4$ is mercapto-C(1-12)alkyl, and wherein the at least one alkenyl-derivatized polysiloxane and the at least one mercapto-derivatized polysiloxane-based crosslinking agent form a stable emulsion.

It is a further object of the present invention to provide a process for producing an additive manufacturing composition as described above, wherein the at least one alkenyl-derivatized polysiloxane and the at least one mercapto-derivatized polysiloxane crosslinking agent are formed into a stable emulsion.

It is a further object of the present invention to provide a use of the additive manufacturing composition of the invention for the additive manufacturing of an object composed of single or multiple materials and exhibiting varying mechanical and optical properties.

It is a further object of the present invention to provide a process of additive manufacturing an object, such as a cured composition, from an additive manufacturing composition of the invention, wherein said object is preferably manufactured by stereolithography, e.g., laser based stereolithography (SLA) and digital light processing (DLP), material jetting, drop on demand, volumetric 3D printing, i.e. holographic laser 3D printing, material extrusion, such as robocasting. Thus, in some embodiments the 3D object is manufactured by dispensing and solidifying an additive manufacturing composition of the invention onto a platform in a continuous or layer-by-layer fashion, such as by SLA or DLP, preferably DLP in a top-down orientation. In other embodiments the 3D object is manufactured by solidifying an additive manufacturing composition of the invention at the same time in one part, such as by volumetric 3D printing, i.e., holographic laser 3D printing.

It is a further object of the present invention to provide a digitally fabricated silicone.

It is a further object of the present invention to provide a cured composition prepared by a method as disclosed herein The following detailed description together with the specific examples are intended to provide an overview or framework for understanding the nature and character of the disclosure. The accompanying drawings are included to provide a further understanding, and are incorporated into and constitute a part of this specification.

DETAILED DESCRIPTION OF THE INVENTION

Figure 1:
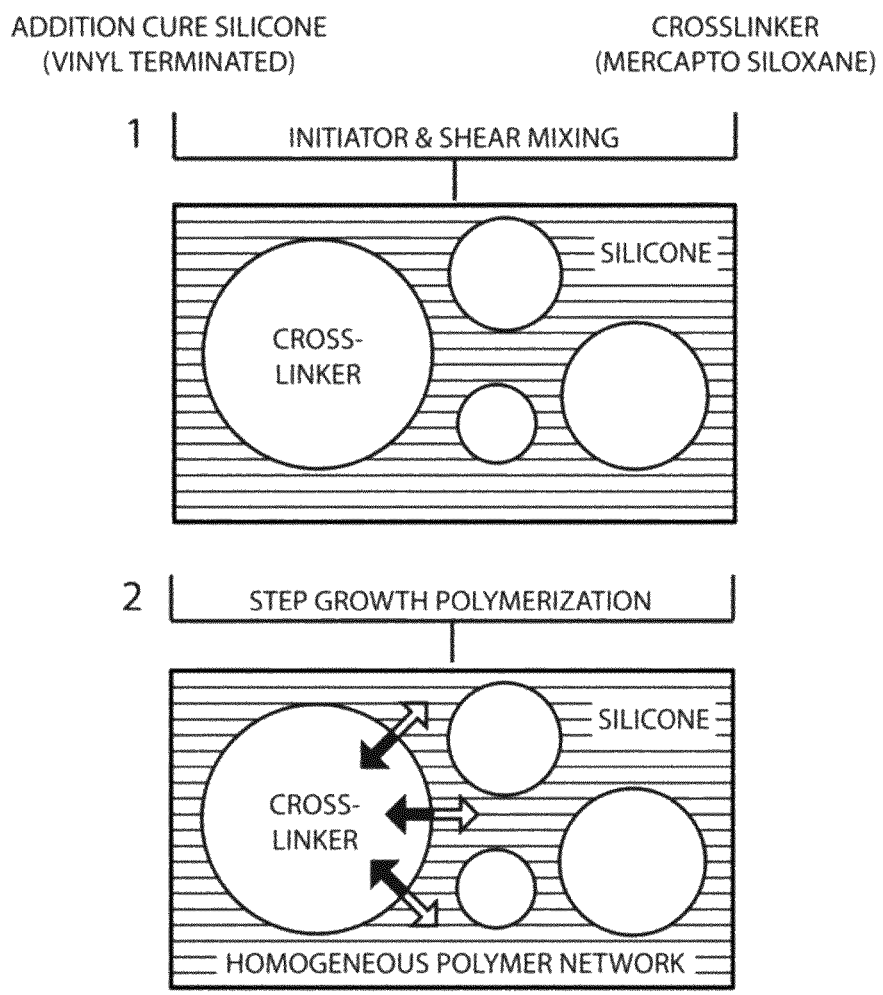
FIG. 1 is a schematic illustration of the emulsion formation upon mixing an alkenyl-derivatized polysiloxane and a mercapto-derivatized polysiloxane-based crosslinking agent (step 1) and the step growth polymerization occurring at the emulsion interface.

It is an object of the present invention to provide an additive manufacturing composition comprising: at least one alkenyl-derivatized polysiloxane and at least one mercapto-derivatized polysiloxane crosslinking agent of formula (I): $R^1(R)_2SiO((R^3R^4)SiO)_xSi(R)_2R^2$ (I), wherein R is independently C(1-12)alkyl, preferably methyl; $R^1$, $R^2$, $R^3$, $R^4$ are independently C(1-12)alkyl, preferably methyl, or mercapto-C(1-12)alkyl; x is 1 or more, preferably 1 to 1,000, 000; with the proviso that at least one of $R^1$, $R^2$, $R^3$, $R^4$ is mercapto-C(1-12)alkyl, and wherein the at least one alkenyl-derivatized polysiloxane and the at least one mercapto-derivatized polysiloxane crosslinking agent form a stable emulsion.

The term "additive manufacturing", as used herein, refers to methods such as stereolithography, e.g., laser based stereolithography (SLA) and digital light processing (DLP), material jetting, drop on demand, volumetric 3D printing, i.e., holographic laser 3D printing, material extrusion, e.g., robocasting.

In typical stereolithography methods a build platform is positioned in a vat or tank containing an additive manufacturing composition of the invention, at a distance of the height of one layer from the surface of the liquid, and a light source selectively polymerises and solidifies the additive manufacturing composition to generate the next layer. SLA printers use a laser source that travels over the predetermined area of a layer of the part, while DLP printers use a digital light projector to flash a single image of each layer all at once, which can also raster over larger areas for build volumes larger than the projection. The platform is subsequently moved at a distance such that the recoater can recoat or wipe the surface. The process steps are repeated until the 3D object is completed. Further post-processing under UV/Vis light ensures that the object is in a fully crosslinked state (necessary in particular if high mechanical and thermal properties are desirable).

A "top-down" orientation refers to a printer wherein the light source is placed above the tank and the build platform begins at the very top of the tank and moves downwards after every layer. Typically, the direction normal to the 3D printed layers of a 3D object is referred to as the z-direction (or axis) and the direction parallel to the 3D printed layers of a 3D object (and thus perpendicular to the z axis) is referred to as the xy plane. The object in a top-down printer is built facing up.

A "bottom-up" orientation refers to a printer wherein the light source is placed under the tank having a suitable transparent bottom to allow the light source to pass through. After every layer, the cured additive manufacturing composition is detached from the bottom of the tank, as the build platform moves upwards. The object in a bottom-up printer is built facing upside down.

In typical material jetting methods, a printhead deposits droplets of an additive manufacturing composition to the desired locations on a build platform. A radiation source attached to the printhead cures and solidifies the composition to generate the first layer and the build platform is moved downward to allow the process steps to be repeated until the 3D object is completed. The deposition of the droplets can be in a continuous fashion, wherein the droplets are generated by breaking up a continuous stream of droplets, or by drop on demand, wherein droplets are generated when required.

In typical volumetric (i.e., holographic) printing methods, the 3D object is generated simultaneously as one part, by projecting light source(s) in a hologram-like pattern into a transparent tank containing an additive manufacturing composition to allow the composition to cure as one part. After the object is completed, the excess composition can be drained off to reveal the completed object.

In typical material extrusion printing methods, an additive manufacturing composition is extruded through a nozzle and onto a build platform or substrate, whereby the nozzle is following a predetermined path to build the 3D object layer-by-layer.

The additive manufacturing composition can be used in any typical 3D printer. In one embodiment the composition can be used in SLA or DLP printers, preferably top-down SLA or DLP printers in which a build platform is positioned at the very top of a tank filled with liquid photopolymer resin and a light source placed above the tank selectively cures and solidifies layer by layer (by moving the platform downwards after each layer) to create the desired 3D product (face up). In another embodiment the additive manufacturing composition can be used in volumetric or holographic 3D printers, wherein laser-generated, hologram-like 3D images are flashed into an additive manufacturing composition contained in a tank to create the desired 3D product in one part.

The use of the additive manufacturing composition in a DLP printer is a particularly advantageous embodiment for the production of cured compositions because the cured compositions thus prepared may possess a high degree of transparency. The high degree of transparency may be ascribed to various factors, including the smooth surface of the cured composition and the small thickness of the layers that are solidified during the printing process. The small thickness of the layers that are solidified implies that a high degree of polymerization is achieved during the printing process, resulting in little to no residual monomers which would cause opacity. The smoothness of the surface leads to reduced light diffraction.

The term "emulsion," as used in the context of the present invention, refers to a mixture of two or more immiscible (polysiloxane) liquid components in which (at least) one component (the dispersed phase) is dispersed in the (at least one) other component (the continuous phase) in the form of droplets. It will be appreciated that the term "immiscible" also includes predominantly or substantially immiscible phases whereby the dispersed phase has a finite solubility in the continuous phase. The mixture may be stabilized further by the presence of additives, such as emulsifiers or surfactants.

The term "stable emulsion", as used in the context of the present invention, refers to an emulsion wherein the (at least one) component constituting the dispersed phase remains substantially dispersed in the continuous phase, for example upon either standing at ambient temperature, e.g., 25° C., for one month or more, or upon exposure to centrifugal rotation at about 3,500 rpm for 1 hour or longer. In particular, no signs of either creaming of the emulsion or separation of the two phases of the emulsion are observed in stable emulsions under these conditions.

The term "transparent" as used herein refers to the property of transmitting at least 70%, preferably at least 80%, more preferably at least 90% of the visible incident light (without diffusing it). The term "translucent" refers to the property of a reduced passage of light, such as transmitting less than 60%, preferably less than 50%.

The term "polysiloxane" refers to linear, branched and cyclic polyorganosiloxanes, which are characterized by the general formula $(R)_3Si-(O-Si(R)_2)_n-O-Si(R)_3$, with R being H or an organic group and n is an integer, typically between 1 and $10^9$. In the polyorganosiloxanes, the organo moiety may be the same (such as a methyl group in polydimethylsiloxane or PDMS) or may vary within a single molecule (as for example in polydimethyldiphenyl siloxane or diphenyl dimethicone).

In alkenyl-derivatized polysiloxanes for use in the present invention, at least one, preferably at least two R groups comprise an alkenyl moiety, preferably a vinyl, allyl, butenyl or pentenyl group, more preferably a vinyl group, which can be positioned terminally and/or in a sidechain.

Alkenyl-derivatized polysiloxanes useful in the present invention include polymers, prepolymers, oligomers or macromonomers having at least 1, typically between 1 and $10^9$, preferably 100 to 10,000,000 siloxane repeat units, in form of homopolymers or random- or block-copolymers, preferably homopolymers. Optionally, the alkenyl-derivatized polysiloxanes may carry additional functional groups, e.g., as terminal groups or located on side chain(s) of the siloxane backbone.

The weight average molecular weight range of the alkenyl-derivatized polysiloxanes is 100 to $10^9$ g/mol, preferably 1,000 to 10,000,000. The alkenyl-derivatized polysiloxanes useful in the present invention may have a viscosity between $0.1$-$10^4$ Pa*s, preferably $1$-$10^2$ Pa*s when measured at a shear rate of 1/s according to standard steady-state rheological measurements.

Examples of alkenyl-derivatized polysiloxanes include, for example, alkenyl-derivatized poly(alkylsiloxane), alkenyl-derivatized poly(arylsiloxane), alkenyl-derivatized poly(alkylarylsiloxane), and alkenyl-derivatized poly(alkyl (aryl)siloxane), preferably alkenyl-derivatized polyalkylsiloxanes (optionally carrying further functional groups). In a specific embodiment, alkenyl-derivatized polysiloxanes include alkenyl-derivatized poly((C1-12)alkyl-siloxane). In some embodiments, alkenyl-derivatized polysiloxanes are preferably alkenyl-derivatized poly((C1-6)alkyl-siloxane), wherein C(1-6)alkyl is preferably methyl, ethyl, propyl, butyl.

Some exemplary preferred polysiloxanes are alkenyl-derivatized poly(dimethylsiloxane), alkenyl-derivatized poly(diphenylsiloxane), alkenyl-derivatized poly(methylphenylsiloxane), alkenyl-derivatized poly(dimethyldiphenylsiloxane), Such polymers can be prepared as described in numerous patents and publications or are commercially available as Liquid Silicone Rubbers (LSR) or Room-Temperature Vulcanization (RTV) Silicones, for example, Ecoflex® 00-15, Ecoflex® 00-20, Dragon Skin™ 30, Sorta-Clear® 40 (KauPo, DE), PlatSil® 73-15 (Mouldlife, GB), Sylgard® 184 (Sigma-Aldrich, CH), Zhermack 00 Zhermack 08, Zhermack 13 (Zhermack, DE), LS-8941 (NuSil, USA), KE-2061 (Shin-Etsu Chemical, JP), Vinyl Q-resin dispersion in vinyl terminated polydimethylsiloxane (Gelest Inc., DE).

The additive manufacturing polysiloxane composition may comprise one alkenyl-derivatized polysiloxane or a blend of two or more alkenyl-derivatized polysiloxanes.

Mercapto-derivatized polysiloxane crosslinking agents useful in the present invention have the formula (I):

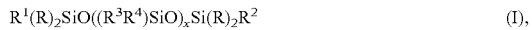

$R^1(R)_2SiO((R^3R^4)SiO)_xSi(R)_2R^2$ (I), wherein R is independently C(1-12)alkyl, preferably methyl; $R^1$, $R^2$, $R^3$, $R^4$ are independently C(1-12)alkyl, preferably methyl, or mercapto-C(1-12)alkyl; x is 1 or more, preferably 1 to 1,000,000; with the proviso that at least one, preferably 10 to 100,000, of $R^1$, $R^2$, $R^3$, $R^4$ is mercapto-C(1-12)alkyl.

In some embodiments C(1-12)alkyl is preferably C(1-8)alkyl, more preferably C(1-6)alkyl, more preferably methyl, ethyl, butyl, propyl. Thus, the mercaptoalkyl group preferably has 1 to 8 C atoms, preferably 1 to 6 C-atoms, and is more preferably mercapto-methyl, mercapto-ethyl, mercapto-butyl, mercapto-propyl, most preferably mercapto-propyl.

In some embodiments, x is about 100.

In preferred embodiments, mercapto-derivatized polysiloxane crosslinking agents useful in the present invention have the formula (I), wherein R, $R^1$, $R^2$, $R^4$ are independently C(1-12)alkyl, preferably methyl; $R^3$ is independently mercapto-C(1-12)alkyl, preferably mercapto-C(1-6)alkyl, or C(1-12)alkyl, preferably methyl; x is 1 or more, preferably 2 to 100,000, preferably 5 to 1,000.

For x>1, $R^3$ can be the same (e.g. a homopolymer), preferably $R^3$ is mercapto-C(1-12)alkyl, more preferably mercapto-C(1-6)alkyl as defined above. Alternatively, $R^3$ can be different (e.g. an alternating or block copolymer), preferably $R^3$ is-(mercapto-C(1-6)alkyl)$_n$-(C(1-12)alkyl)$_m$, or —(C(1-12)alkyl)$_m$-(mercapto-C(1-6)alkyl)$_n$-, wherein-(mercapto-C(1-6)alkyl)$_n$-(C(1-12)alkyl)$_m$-are as defined above and n and m are independently 1 to 100,000, preferably n is 1 to 10,000 and m is 1 to 10,000.

In other preferred embodiments, mercapto-derivatized polysiloxane crosslinking agents useful in the present invention have the formula (I), wherein R, $R^1$, $R^2$ are independently C(1-12)alkyl, preferably methyl; $R^3$, $R^4$ are independently mercapto-C(1-12)alkyl, preferably mercapto-C(1-6)alkyl, or C(1-12)alkyl, preferably methyl; x is 1 or more, preferably 2 to 100,000, preferably 5 to 1,000.

For x>1, $R^3$, $R^4$ can independently be the same (e.g. a homopolymer), preferably $R^3$, $R^4$ are independently mercapto-C(1-12)alkyl, more preferably mercapto-C(1-6)alkyl as defined above. Alternatively. $R^3$, $R^4$ can independently be different (e.g. an alternating or block copolymer), preferably $R^3$, $R^4$ are independently-(mercapto-C(1-6)alkyl)$_n$-(C(1-12)alkyl)$_m$, or —C(1-12)alkyl)$_m$-(mercapto-C(1-6)alkyl)$_n$-, wherein-(mercapto-C(1-6)alkyl)$_n$-(—C(1-12)alkyl)$_m$-are as defined above and n and m are independently 1 to 100,000, preferably n is 1 to 10,000 and m is 1 to 10,000.

In other preferred embodiments, mercapto-derivatized polysiloxane crosslinking agents useful in the present invention have the formula (I), wherein R, $R^1$, $R^2$, $R^4$ are independently C(1-12)alkyl, preferably methyl; $R^3$ is independently mercapto-methyl, mercapto-butyl mercapto-ethyl or mercapto-propyl; x is 1 or more, preferably 2 to 100,000, preferably 2 to 10,000.

In specific embodiments, the mercapto-derivatized polysiloxane crosslinking agent of formula (I) useful in the present invention is (mercaptopropyl)methylsiloxane homopolymer (MPMS) having 1 or more, preferably 2 to 100,000 mercaptopropyl units, preferably 2 to 10,000.

In other specific embodiments, the mercapto-derivatized polysiloxane crosslinking agent of formula (I) useful in the present invention is (mercaptopropyl)methylsiloxane-diemethylsiloxane copolymer wherein n and m are independently 1 to 100,000, preferably n is 1 to 10,000 and m is 1 to 10,000.

The additive manufacturing polysiloxane composition may comprise one mercapto-derivatized polysiloxane crosslinking agent or a blend of two or more mercapto-derivatized polysiloxane crosslinking agent, preferably one mercapto-derivatized polysiloxane crosslinking agent.

In a further embodiment of the additive manufacturing composition according to the present invention, the mercapto-derivatized polysiloxane crosslinking agent has a molecular weight below 100,000 g/mol, preferably below 90,000 g/mol and more preferably below 80,000 g/mol.

In further embodiments of the additive manufacturing composition according to the present invention, the mercapto-derivatized polysiloxane crosslinking agent is present between 0.01 wt % to 35 wt %, preferably between 0.1 and 10 wt %, based on the total weight of the additive manufacturing composition.

In preferred embodiments, the alkenyl-derivatized polysiloxane and the mercapto-derivatized polysiloxane crosslinker are immiscible and are capable of forming an emulsion, preferably a stable emulsion. Thus, in a preferred embodiment of the additive manufacturing composition according to the present invention, the alkenyl-derivatized polysiloxane forms the continuous phase of the emulsion and the mercapto-derivatized crosslinking agent forms the discontinuous phase. More specifically, the emulsion is obtained by means of mixing or shearing (e.g., effective mixing in a suitable high shear mixer) at more than 100 rpm, such as 500 to 5,000 rpm, for several minutes, e.g., at 2,000 rpm for at least 2 minutes, preferably 5 to 15 minutes.

Within said emulsion, the discontinuous phase is mainly present as droplets having a diameter of no more than 100 micrometers, preferably of less than 10 micrometers, preferably 0.1 to 10 micrometers, which allows the emulsion to be sufficiently stable to prevent creaming of the dispersed phase, droplet aggregation, droplet coalescence and coarsening and to thus exhibit a good shelf life of (at least) three months (when stored at e.g. below ambient temperature, e.g., 15° C.). The step-growth polymerization selectively occurs close to or at the emulsion interface until the crosslinking agent is completely used up. The consumption of the dispersed phase (droplets) in the polymerisation process reduces the droplet size and the scattering of visible light, allowing for the preparation of transparent 3D objects. Thus, in specific embodiments the 3D silicone objects obtained according to the invention are transparent.

Moreover, the emulsions of the invention lead to polymerized 3D objects that distinguish themselves by exhibiting unidirectional properties (also with respect to the z-direction) and therefore a specific light penetration depth by light scattering (in the xy plane and the z direction) is achieved, which enables printing in high resolution (e.g., 30 µm) due to the limited penetration depth. Thus, in specific embodiments the 3D silicone objects obtained according to the invention are of high resolution.

In another embodiment, the additive manufacturing composition further comprises at least one free radical photoinitiator, which is capable of being activated upon exposure to radiation, i.e., upon exposure to UV A, UV B, UV C and entire visible range, preferably UVA und the visible range, more preferably 355-420 nm.

Exemplary free radical photoinitiators suitable for the additive manufacturing composition according to the present invention
  (i) acyl- and bisacylphosphine oxides such as 2,4,6-trimethylbenzoyl diphenylphosphine oxide, bis-(2,4,6-trimethylbenzoyl)phenylphosphine oxide;
  (ii) anisoin;
  (iii) benzoin and benzoin alkyl ether, such as benzoin ethyl ether, benzoin isobutyl ether, benzoin methyl ether;
  (iv) benzil and benzil dialkyl ketals such as benzil dimethyl ketal;
  (v) acetophenone; hydroxyacetophenones such as 1-hydroxycyclohexyl phenyl ketone, 2-hydroxy-2-methyl-1-phenyl-1-propanone, 2-hydroxy-1-[4-(2-hydroxyethoxy)-phenyl]-2-methyl-1-propanone, 3'-hydroxyacetophenone, 4'-hydroxyacetophenone, 2-hydroxy-2-methylpropiophenone; (di)alkoxyacetophenones such as 2,2-diethoxyacetophenone, 2,2-dimethoxy-2-phenylacetophenone, 4'-ethoxyacetophenone; aminoacetophenones such as 2-benzyl-2-(dimethylamino)-1-[4-(4-morpholinyl)-phenyl]-1-butanone, 2-methyl-1-[4-(methylthio)-phenyl]-2-(4-morpholinyl)-1-propanone; aryloxyacetophenones such as 4'-phenoxyacetophenone;
  (vi) benzophenone, 3,3',4,4'-benzophenonetetracarboxylic dianhydride, benzoylbiphenyl, (di)hydroxybenzophenones, such as 4'-dihydroxybenzophenone, 3-hydroxybenzophenone, 4-hydroxybenzophenone; and (di)alkylbenzophenones, such as 4-(dimethylamino) benzophenone, 2-methylbenzophenone, 3-methylbenzophenone, 2,5-dimethylbenzophenone, 3,4-dimethylbenzophenone, (di)aminobenzophenones, such as 4,4'-bis(dimethylamino) benzophenone, and 2-benzyl-2-(dimethylamino)-4'-morpholinobutyrophenone, 2-methyl-4'-(methylthio)-2-morpholinopropiophenone;
  (vii) anthraquinone and alkyl anthraquinones, such as 2-ethylanthraquinone;
  (viii) thioxanthones; alkylthioxanthones such as i-propylthioxanthone; and thioxanthen-9-ones such as 2-chlorothioxanthen-9-one;
  (ix) dibenzosuberenone;
  (x) a-Diketones such as camphorquinone, 9,10-phenanthrenequinone, 1-phenyl-propane-1,2-dione, 4,4'-dichlorobenzil, methybenzoylformate or their derivatives;
  (xi) monoacyl- and diacylgermanium compounds such as benzoyltrimethylgermanium, dibenzoyldiethylgermanium, bis-(4-methoxybenzoyl)-diethylgermanium;
  (xii) titanocenes such as bis-(eta$^5$-2,4-cyclopentadien-1-yl)-bis-[2,6-difluoro-3-(1H-pyrrol-1-yl)phenyl]-titanium.

Particular examples are acetophenone, anisoin, anthraquinone, benzil, benzoin, benzoin ethyl ether, benzoin isobutyl ether, benzoin methyl ether, benzophenone, 1-hydroxycyclohexyl phenyl ketone, 3,3',4,4'-benzophenonetetracarboxylic dianhydride, benzoylbiphenyl, 2-benzyl-2-(dimethylamino)-4'-morpholinobutyrophenone, 4,4'-bis(diethylamino)benzophenone, 4,4'-bis(dimethylamino) benzophenone, camphorquinone, 2-chlorothioxanthen-9-one, dibenzosuberenone, 2,2-diethoxyacetophenone, 4,4'-dihydroxybenzophenone, 2,2-dimethoxy-2-phenylacetophenone, 4-(dimethylamino) benzophenone, 4,4'-dimethylbenzil, 2,5-dimethylbenzophenone, 3,4-dimethylbenzophenone, diphenyl(2,4,6-trimethylbenzoyl) phosphine oxide/2-hydroxy-2-methylpropiophenone, 4'-ethoxyacetophenone, 2-ethylanthraquinone, 3'-hydroxyacetophenone, 4'-hydroxyacetophenone, 3-hydroxybenzophenone, 4-hydroxybenzophenone, 1-hydroxycyclohexyl phenyl ketone, 2-hydroxy-2-methylpropiophenone, 2-methylbenzophenone, 3-methylbenzophenone, methybenzoylformate, 2-methyl-4'-(methylthio)-2-morpholinopropiophenone, phenanthrenequinone, 4'-phenoxyacetophenone, and thioxanthene-9-one.

In a specific embodiment, the additive manufacturing composition comprises as a free radical photoinitiator 1-hydroxycyclohexyl phenyl ketone (98%, Alfa Aesar, USA) and/or bis(4-methoxybenzoyl)diethylgermanium (Ivocerin®), Synthon Chemicals, DE) and/or 2,2-dimethoxy-2-phenylacetophenone.

Typically, the at least one photoinitiator is present in the amount of from 0.01 wt % to 1 wt %.

In one preferred embodiment the additive manufacturing composition comprises one free radical photoinitiator.

In another preferred embodiment the additive manufacturing composition comprises a first free radical photoinitiator and a second free radical photoinitiator, e.g. a first free and a second free radical photoinitiator having the same, overlapping or different absorption behaviour. In one embodiment the additive manufacturing composition comprises a first free and a second free radical photoinitiator having overlapping absorption behaviour. In another embodiment the additive manufacturing composition comprises a first free and a second free radical photoinitiator having different absorption behaviour.

It is understood that the absorption spectra of the first and second photopolymerization initiators can have some overlap. For example, the difference between the longest-wavelength absorption maxima of the first and second photopolymerization initiator may be at least 5 nm, preferably at least 10 nm, more preferably at least 15 nm.

In specific embodiments, the longest-wavelength absorption maximum of the first photopolymerization initiator is at a wavelength of less than 400 nm, e.g., of from 300 to less than 400 nm, preferably of from 330 to less than 400 nm, more preferably of from 340 to 380. The longest-wavelength absorption maximum of the second photopolymerization initiator is at a wavelength of at least 380 nm, e.g., of from 380 to 600 nm, preferably of from 400 to 500 nm, more preferably of from 400 to 480 nm.

Preferred embodiments include a combination of a germanium compound with a hydroxyacetophenone, in particular a combination of bis(4-methoxybenzoyl)dimethylgermanium (Ivocerin) with 1-hydroxycyclohexyl phenyl ketone. Preferred ratios range from 0.1 to 1 wt % of a hydroxyacetophenone such as 1-hydroxycyclohexyl phenyl ketone and 0.05 to 0.5 wt % of a germanium compound such as Ivocerin.

In a further embodiment, the additive manufacturing composition further comprises at least one inhibitor such that the photocatalytic reaction is confined to regions of direct exposure, is not initiated prematurely and allows to assure adequate shelf life. Suitable inhibitors include, e.g., light blockers with an absorption maximum in the range of the beam wavelength of the light source used for photopolymerization or colorants such as (an inorganic or organic) color pigments (e.g., carbon black, blue, red), an organic dye, or the like, that absorb the light and do not retransmit. Other suitable inhibitors (in particular for transparent compositions include fluorescent agents/optical brighteners, photochromic and thermochromic dyes, leuco dyes or absorbers that absorb light and emit light at a different frequency Commercially available inhibitors suitable for use in the additive manufacturing composition include avobenzone, coumarin, 1-(4-tert-butylphenyl)-3-(4methoxyphenyl)-1,3-propanedione (TCI, DE), 5-tert-butyl-2-hydroxybenzaldehyde (Sigma-Aldrich, CH), 2,2'-(2,5-thiophenediyl)bis(5-tert-butylbenzoxazole (Sigma-Aldrich, CH), 2-hydroxy-4-methoxybenzophenone-5-sulfonic acid (Alfa Aesar, USA) or 2-hydroxy-4-methoxybenzophenon (Alfa Aesar, USA).

An inhibitor may be present in the additive manufacturing composition in the amount of 0 to 5 weight percent, preferably 0.05 to 5 weight percent in case of pigments and 0.05 to 3 weight percent in case of optical brighteners.

The determination of the wavelength of the absorption maximum and of the molar absorption coefficient of the photoinitiators and inhibitors is usually carried out by means of UV-VIS spectroscopy, such as a customary double-beam UV-VIS spectrometer, at room temperature using a solution in a suitable solvent such as acetonitrile, preferably at a concentration of 1 mM. A customary double-beam UV-VIS spectrometer can for instance be used for the measurement.

The additive manufacturing compositions of the invention may further comprise additives, such as a polysiloxane resin, and the like to allow for adjusting the specific mechanical and optical properties of the final product.

Thus, in a further embodiment the additive manufacturing composition of the invention may comprise a polysiloxane resin for reinforcement, such as a silanol-trimethylsilyl-modified polysiloxane Q resin or a polysiloxane MQ resin. If present, the reinforcing polysiloxane resin may be present in an amount of up to 100 wt % and preferably up to 50 wt % with respect to the total amount of alkenyl-derivatized polysiloxane in the additive manufacturing composition, i.e., the weight ratio between the reinforcing polysiloxane resin, if present, and the alkenyl-derivatized polysiloxane may range from 0 to 50 wt %, preferably 0.1 to 10 wt %.

The reinforcing polysiloxane resin may be included in the additive manufacturing composition in cases where the crosslinked additive manufacturing composition should exhibit medium shore hardness, e.g. A30-A50, or high shore hardness, e.g. above A50, such as medium or high elastic modulus (e.g. above 3 MPa and 5 MPa, respectively) and/or medium or low elongation at break (e.g. below 500% and 250, respectively).

In cases where the crosslinked additive manufacturing composition should exhibit low shore hardness, e.g., below A30, such as low elastic modulus (e.g. below 1 MPa) and/or high elongation at break (e.g. above 500%), the reinforcing polysiloxane resin is preferably omitted.

In addition, the additive manufacturing composition may optionally comprise one or more further additives to modify properties such as flowability, mechanical properties, storage properties: an electrically or thermally conductive material, a reinforcing fiber, coloring agent, surfactant, preservative stabilizer, plasticizer, lubricant, defoamer, leveling agent.

Typically, the mercapto-derivatized polysiloxane crosslinking contained in the additive manufacturing composition according to the present invention, is being activated upon exposure to radiation, in particular upon exposure to UV/Vis radiation. UV/Vis radiation having a wavelength of from 190 nm to 900 nm can easily be generated using mercury vapor lamps or energy-efficient LED lamps and has the advantage of being able to penetrate deeply into the bulk of the additive manufacturing composition according to the present invention such as to allow the effective crosslinking of thicker layers of additive manufacturing composition according to the present invention. Generally, LED lamps may be used at relatively low intensity, i.e., 20 mW/cm$^2$ (as measured at the surface of the projection plane).

Alternatively, the crosslinking agent may also be capable of being activated upon exposure to a change in temperature, such as an increase in temperature or a decrease in temperature, or by using high energy beams, e.g., e-beam.

In certain embodiments, the ratio of the at least one alkenyl-derivatized polysiloxane and at least one mercapto-derivatized polysiloxane crosslinking agent is 1,000:1 to 5:1, preferably 500:1 to 10:1. In particular, in embodiments of an additive manufacturing composition for silicones with a low shore hardness, the ratio of the at least one alkenyl-derivatized polysiloxane and at least one mercapto-derivatized polysiloxane crosslinking agent is 1,000:1 to 50:1, preferably 500:1 to 50:1. For embodiments of an additive manufacturing composition for silicones with a high shore hardness, the ratio of the at least one alkenyl-derivatized polysiloxane and at least one mercapto-derivatized polysiloxane crosslinking agent is 50:1 to 5:1, preferably 25:1 to 10:1.

The mechanical properties of the crosslinked additive manufacturing composition may be modified by changing the nature of the alkenyl-derivatized polysiloxane, mercapto-derivatized polysiloxane crosslinking agent and the initiator, in particular by varying the amount and mercapto functionality of the crosslinking agent, the molecular weight (length), the amount of alkenyl derivatization and the viscosity of the polysiloxane or by adding reinforcing fillers.

In cases where the silicone product should exhibit low shore hardness, e.g. below A30, such as high elongation at break, i.e. above 500%, the mercapto-derivatized polysiloxane crosslinking agent may preferably be included in an amount of between 0.01 wt % to 5 wt %, based on the total weight of the additive manufacturing composition and/or is essentially free from reinforcing polysiloxane resin, and/or the polysiloxane has a viscosity of up to 100,000 mPa*s or between 100 to 20,000 mPa*s.

In cases where the crosslinked additive manufacturing composition (herein also referred to as silicone product) should exhibit medium shore hardness, e.g. A30-A50, such as medium elongation at break, i.e., below 500%, the mercapto-derivatized polysiloxane crosslinking agent may preferably be included in an amount of between 2 wt % to 10 wt %, based on the total weight of the additive manufacturing composition, and/or the polysiloxane has a viscosity of up to 100,000 mPa*s or preferably between 1,000 and 30,000 mPa*s.

In cases where the crosslinked additive manufacturing composition (herein also referred to as silicone product) should exhibit high shore hardness, e.g. above A50, such as low elongation at break, i.e. below 250%, the mercapto-derivatized polysiloxane crosslinking agent may preferably be included in an amount of between 5 wt % to 15 wt %, based on the total weight of the additive manufacturing composition and/or comprises optionally an amount of up to 50 wt % of a reinforcing polysiloxane resin with respect to the total amount of polysiloxane in the additive manufacturing composition, and/or the polysiloxane has a viscosity of up to 500,000 mPa*s, such as up to 100,000 mPa*s, or preferably between 5,000 and 50,000 mPa*s.

The additive manufacturing compositions according to the present invention may further be tailored to exhibit specific optical properties, by way of the polymerisation at or close to the droplet surface and by controlling the nature and amount of the components and the polymerization mechanism. For example, the crosslinked compositions may be transparent to visible light or translucent to visible light.

It is also an object of the present invention to provide a process for producing an additive manufacturing composition of the invention, wherein the alkenyl-derivatized polysiloxane and the mercapto-derivatized polysiloxane crosslinking agent are formed into an emulsion together with the at least one photoinitiator. The at least one alkenyl-derivatized polysiloxane and the at least one mercapto-derivatized polysiloxane crosslinking agent may be used as such or dissolved in a suitable solvent (0 to 99%).

The viscosity of the composition of the invention may be controlled by decreasing or increasing the temperature of the composition. For example, the temperature may be decreased to −50° C. or increased to +250° C., preferably to 100° C. more preferably to 60° C.

The viscosity of the composition of the invention may be controlled by using more than one alkenyl-derivatized polysiloxane (blends) of different viscosity, i.e., diluting a composition of the invention with (at least) one low-viscous alkenyl-derivatized polysiloxane or functionalized silicone fluids. Alternatively, the viscosity of the composition of the invention may be controlled by dilution with unmodified silicone fluids or oil. Depending on the final viscosity to be achieved, the organic solvent is preferably present in an amount of 0.1% to 20%.

As a further alternative, the viscosity may be controlled by dilution with a solvent. Thus, the compositions may be free of a solvent or diluted with a suitable solvent. Preferably, the compositions have a viscosity of 100 Pa*s or less measured at 1 Hz, more preferably 0.1-50 Pa*s, more preferably 0.1-30 Pa*s. Specifically, the viscosity is chosen such that the compositions of the invention exhibit a flow behaviour particularly well suited for a 3D printing process according to the invention, in winch a re-coater or wiper is used for wiping across the printed surface, i.e. a flow behaviour that allows fast and smooth recoating and thus enables rapid printing times. Solvents suitable for dilution include an organic solvent, for example alkanes, such as linear and cyclic alkanes, e.g., pentane, hexane, heptane, cyclopentane, cyclohexane and higher alkanes, halogenated alkanes, e.g., dichloromethane, trichloromethane, tetrachloromethane, 1,2-dichloroethane; or an aromatic solvent, e.g. benzene, toluene, xylene. Depending on the final viscosity to be achieved, the organic solvent is present in an amount of 0% to 20%.

In specific embodiments, the emulsion is obtained as described hereinabove, preferably by means of effective mixing achieved by commonly used techniques such as in a suitable high shear mixer at more than 1000 rpm, such as 1500 to 2500 rpm, e.g. 2000 rpm for at least 2 minutes, preferably 5 to 15 minutes, or in a three-roll mill having a gap size ≤100 microns, preferably ≤40 microns, more preferably about 10 microns at more than 30 rpm, such as 50 to 500 rpm, e.g. 250 rpm.

It is also an object of the present invention to provide 3D printed silicone structure using the compositions of the invention, wherein the silicone structure comprises thioether groups. In some embodiments, the 3D printed silicone structure comprises MPMS derived repeat units.

In some embodiments, the 3D printed silicone structure is transparent.

As readily understood by the skilled person, a 3D printed silicone structure obtained by layer-based methods comprises multiple layers with the single layers having a layer thickness of e.g. 0.01 to 1 mm, while a 3D printed silicone structure obtained by volumetric 3D methods is formed all at once and thus has no layers.

A 3D printed silicone according to the invention may be produced by a process according to the invention as described above.

Another aspect of the invention comprises a method of preparing a cured composition, in particular a 3D printed silicone structure. The method includes the steps:
 a) Preparation of a 3D model of a preproduct;
 b) Additive manufacturing of the preproduct according to the 3D model of the preproduct using an additive manufacturing composition according to any of the embodiments as described herein and an additive manufacturing device; and
 c) Curing the preproduct thereby providing the cured composition.

It is understood that the preproduct is the product directly obtained by step b), before the curing step c). Typically, the 3D model of the preproduct is prepared as a CAD (computer aided design) file or 3D scan. The resulting CAD data can then be converted into a format which is suitable for or readable by the additive manufacturing device. The 3D model of the preproduct usually contains all relevant information necessary for the additive manufacturing of the actual preproduct in stop b). For example, the 3D model may contain information regarding dimension, structure, size, color, etc. of the preproduct. Furthermore, the 3D model may contain information regarding the orientation of the preproduct. In particular, the 3D model of the preproduct may contain information regarding the orientation of the actual preproduct with respect to the additive manufacturing device or with respect to certain components of the additive manufacturing device.

In some embodiments, the additive manufacturing device comprises a radiation source for irradiating at least a portion of the additive manufacturing composition.

Preferably, the radiation source may be a LED lamp. In particular, the intensity of the LED lamp is between 1 and 1,000 mW/cm$^2$, preferably between 10 and 100 mW/cm$^2$.

In further embodiments, additive manufacturing in step b) is performed by light polymerization, wherein additive manufacturing is performed by VAT photopolymerization, volumetric 3D printing or holographic laser 3D printing or any other suitable method. In preferred embodiments, additive manufacturing is performed by DLP or SLA VAT photopolymerization. Particularly, photopolymerization is performed in a top-down orientation.

In other embodiments, the additive manufacturing device comprises a chamber containing the additive manufacturing composition and a platform within the chamber which is moved in the z-direction during step b). Such an additive manufacturing device is either suitable for use in a top-down or in a bottom-up orientation.

In further embodiments, the 3D model in step a) is prepared such that the stability of the preproduct is maximized. Such stabilization, such as mechanical stabilization or positional stabilization, in particular lateral stabilization is important for 3D printed silicones, as in contrast to commonly 3D printed rigid materials, the elastic and soft characteristics of silicones leads to greater instability of the emerging preproduct during the additive manufacturing.

For example, in some embodiments, the center of mass of the actual preproduct is determined in step a). The 3D model of the preproduct is prepared such that a distance between the determined center of mass of the preproduct and the platform is minimized. Thus, in these embodiments, the 3D model of the preproduct contains data regarding the orientation of the preproduct with respect to the platform. Minimizing this distance provides for a significant increase in stability of the preproduct. In particular, the lateral stability is increased, which is typically critically effected by the use of a recoater. Consequently, the necessity of printing large support structures is decreased.

In further embodiments, the 3D model of the preproduct in step a) is prepared such that the surface area of the actual preproduct being in contact with the platform and/or the projected surface area from the preproduct to the build platform is maximized, thereby increasing the stability of the preproduct.

Alternatively, or additionally, the stability of the preproduct may be increased by providing support structures, which may be more massive than the ones commonly used for rigid 3D printed polymers. Typically, these support structures may already be contained in the 3D model of the preproduct. Such support structures are commonly removed from the preproduct after the additive manufacturing is complete. Thus, embodiments with support structures may comprise the removal of the support structure, either before or after step c). Removal may be achieved by any suitable method, such as cutting, slicing, ripping etc. in a swollen state.

In some embodiments, the additive manufacturing device comprises a recoater or wiper, for example a blade. Furthermore, step b) of the method according to the invention may comprise the steps:

i) Dipping the platform into the additive manufacturing composition at a predefined height to apply a layer of the additive manufacturing composition to the platform or to the surface of the emerging preproduct;
ii) Moving the platform such that at least the applied layer of additive manufacturing composition is above the additive manufacturing composition;
iii) Providing a film of the additive manufacturing composition with a predefined thickness by wiping the applied layer of the additive manufacturing composition with the recoater;
iv) Irradiating the applied film of the additive manufacturing composition with the radiation source;
v) Optionally moving the platform in the z-direction; and/or
vi) Optionally repeating steps ii), iii) iv) and/or v).

In some embodiments, the method consists of steps i) to vi).

Typically, in step i), the predefined height is typically chosen such that the platform dips more than an additive manufacturing layer height into the additive manufacturing composition. An additive manufacturing layer height is the height of a layer which is formed during step iv) and may preferably be in the range of 5 to 1,000 μm. Preferably, the predetermined height is chosen such that the additive manufacturing composition covers the entire surface of the platform or the entire surface of the emerging preproduct. The predetermined height is thereby influenced by the dipping speed of the platform, material flow behavior and surface tension. Alternatively, or additionally, the predefined height may be chosen such that the distance between the platform and the surface of the additive manufacturing composition within the chamber is at least between 1,000 and 50,000 μm.

In some typical embodiments, a self-leveling of the applied film is performed after step ii) and before step iii), by providing a self-leveling time of preferably 100 to 10,000 ms, which is sufficient for efficient self-leveling of the additive manufacturing composition.

In some embodiments, wiping may be performed by mechanical wiping in circular trajectory or in a linear motion. In general, wiping removes the excess material and only leaves an additive manufacturing layer thickness of raw material on top of the emerging object.

It is readily understood by the skilled person that a surface of the emerging product refers to the most recently manufactured layer, which will be covered by an additional layer upon repeating steps ii) to iv).

In step iv), the z-direction refers to the printing direction. Thus, the z-direction is transverse to the manufactured layers of the preproduct. For example, if additive manufacturing is performed with a top-down orientation, the platform is moved downwards, i.e., in the direction of the bottom of the chamber.

Movement in the z-direction is performed by at least the thickness of a single layer preferably 5 to 1,000 μm.

In further embodiments, the distance of the platform to the radiation source is adjusted after step ii) and before irradiating the applied film.

In some embodiments, the radiation source is moved into a predefined focal distance before step iv). For example, the predefined focal distance may be 10 to 100 cm, preferably 15 to 30 cm.

In further embodiments, illuminating the applied film in step iv) is performed for more than 50 ms, in particular more than 150 ms. Preferably, the applied film is illuminated for 100 to 5,000 ms, more preferably for 150 to 4,000 ms.

In some embodiments, the recoater is operated at a speed of 50 to 3,000 steps/s. The speed steps/s refers to the amount of steps per second of a stepper motor driving the recoater. This value has been found to enable a fast printing speed, but also not critically influence the lateral stability of the emerging preproduct.

In some embodiments, the additive manufacturing device comprises a scalable housing. Preferably, the housing is hermitically sealable. Typically, the housing is free of oxygen. Preferably the sealed housing is filled or pressurized essentially only with an inert gas, such as nitrogen or argon. Employing an inert atmosphere increases the yield of the polymerization reaction, as the presence of oxygen may react and/or quench with any of the radical species formed during the thiolene reaction.

In further embodiments, the additive manufacturing composition is maintained at a predefined temperature during step b) of the method according to the invention, thereby adjusting the viscosity of the additive manufacturing composition. It has been observed that the viscosity should typically not exceed 50 Pa*s. The higher the viscosity, the slower is the self-leveling to provide a smooth surface before irradiation can take place. Thus, if the viscosity of the additive manufacturing composition is too high, its temperature may be increased, fire predefined temperature may in some embodiments be in the range of 0 to 250° C.

In some embodiments, the intensity of irradiation, which is typically measured at the surface of the additive manufacturing composition and/or the applied film to be illuminated by the radiation source, is reduced by 0-99%, preferably 50 to 90% of its original value. The use of the additive manufacturing composition as described herein has the advantage that its reactivity in the polymerization reaction is high. Therefore, the intensity of the radiation source can be reduced, which significantly reduces over exposure due to scattering and thus increases the printing resolution.

For example, in some embodiments the intensity of irradiation is reduced by digitally changing the grey scale of the projector and/or by providing a physical light filter between the radiation source and additive manufacturing composition.

In further embodiments, wherein in step c) curing comprises prewashing the preproduct. Prewashing may typically be performed by prewashing the preproduct with a solvent, for example an alkane, such as cyclohexane, n-hexane, pentane and the like for removing any residues of the additive manufacturing composition. Additionally, or alternatively, the preproduct is then swelled in preferably the same or alternatively in another solvent, either by rinsing the preproduct or by immersing the preproduct in this other solvent. As an alternative to the preferred alkane solvents, alcohols, such as i-propanol, n-propanol or ethanol may be used for swelling the preproduct. In preferred embodiments, agitation, stirring, vibration, sonification and/or heating can be used for improving the swelling of the product. Additionally, or alternatively, the preproduct is post cured under UV irradiation, preferably for 10 to 30 min. Post curing is preferably performed in a swollen state of the preproduct. The post curing ensures complete polymerization of the components of the additive manufacturing composition. It is particular advantageous to combine swelling of the preproduct followed by post curing under UV irradiation, as the swelling leads to higher light-penetration and thus enhances the mechanical properties of the cured composition. Additionally, or alternatively, the preproduct may be further cured at room temperature or in an oven with a temperature of 20 to 200° C. Preferably, curing in step consist of the following steps in the following order: prewashing the preproduct, swelling the preproduct, post curing the preproduct with UV irradiation and curing at room temperature or in an oven.

It is understood that the Examples are only selective illustrations of the present invention and various changes may be made without departing from the spirit and scope of the invention.

EXAMPLES

Preparation of testing samples: All components of the composition were mixed using a planetary centrifugal mixer (THINKY mixer, ARE-250) for 3 min at 2000 rpm. Next, the mixture was defoamed for 3 min at 2200 rpm. 10 mg of the composition was poured between glass slides using a 0.4 mm spacer. This system was then exposed to UV light (OmniCure® S1000) for a specified time (e.g., 300 s) at an appropriate distance between lamp and sample (e.g. 10 cm) for polymerisation. Once polymerised, the obtained silicone film was removed and specimens for testing were stamped out.

Tensile testing: Tensile tests were performed with a Shimadzu AGS-X Tensile machine equipped with a 100 N force load cell with the pre-load test set at 0.01 N.

Transparency measurements. Transparency measurements of the silicone parts of defined thickness were conducted with a JASCO V-660 UV-VIS spectro-photometer (187-900 nm) measuring the total in-line absorption.

UV/VIS measurements. UV-VIS measurements were performed on a JASCO V-630 UV-VIS Spectrophotometer (330-800 nm) in absorption mode. Samples were tested in quartz cuvettes at 0.01 M in a suitable solvent (e.g. acetone, toluene, etc.).

DLP-Printing. An Octave Light R1 (405 nm) in a top-down arrangement with a building volume of 32.4×57.6× 120.0 mm was used. The brightness of the projector was adjusted using digital or physical filters.

EXAMPLES

Figure 2:
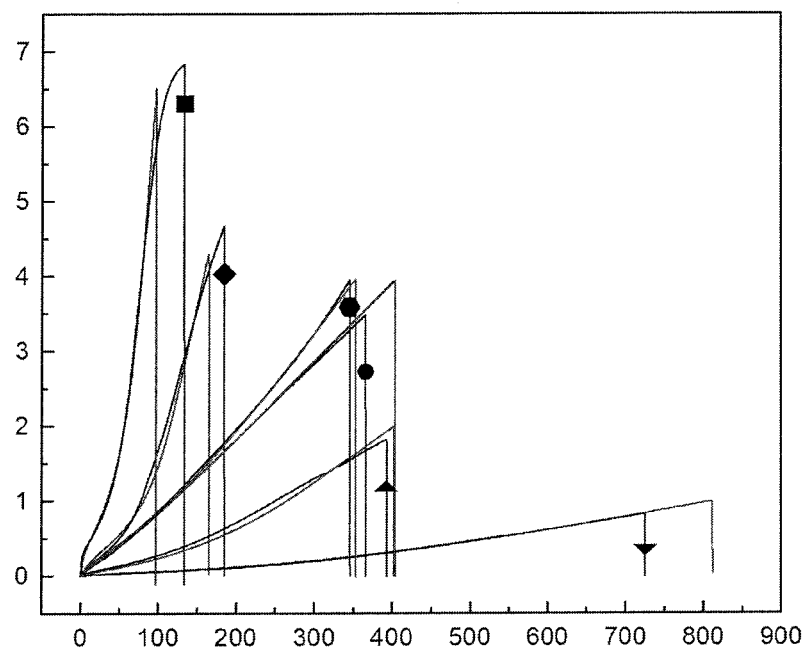
FIG. 2 shows the UV-cured composition of the invention (no marker) in comparison to commercially available addition cured silicone using the silicones Eco-Flex® 00-20 Part A (▼), PlatSil® 73-15 Part A (▲), Dragon Skin™ 30 Part A (●), Sorta-Clear® 40 (●), Sylgard® 184 (◆) and LS-8941 Part A (■). X-axis represents strain (%), y-axis represents strain (N/mm2).
Figure 3:
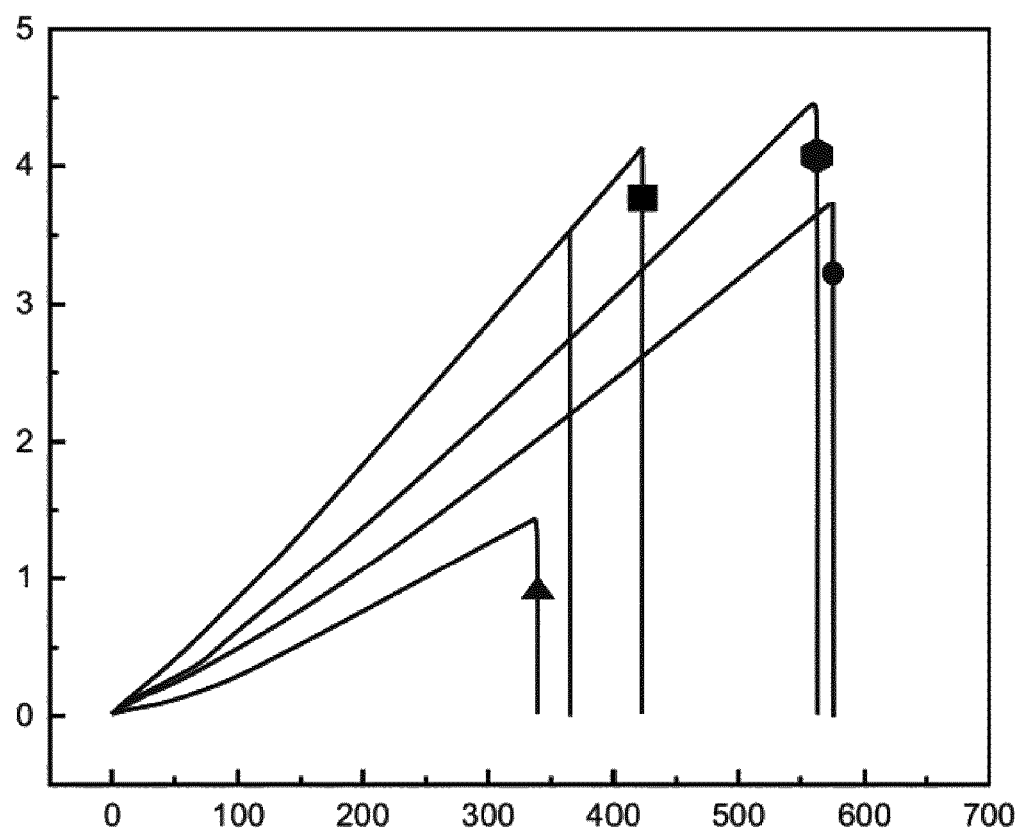
FIG. 3 shows tensile tests on DragonSkin™ 30 with a crosslinker concentration of 0.50% (▲), 0.75% (■), 1.00% (●), 1.25 wt % (■) in comparison to commercially available addition cured silicone (no marker). X-axis represents strain (%), y-axis represents strain (N/mm2).

Example 1: Stress-Strain Relation of Additive Manufacturing Compositions of Different Shore Hardness The mechanical properties of the following silicones were tested: Ecoflex® 00-20 Part A, PlatSil® 73-15 Part A, Dragon Skin™ 30 Part A, Sorta-Clear® 40, Sylgard® 184 and LS-8941 Part A. FIG. 2 shows the UV-cured composition of the invention (red) in comparison to commercially available addition cured silicone (black). The data shows that the Young's modulus of the UV-cured composition of the invention can precisely be tuned to match their commercial counterparts Example 2: Stress-Strain Relation of Additive Manufacturing Compositions Using Different Crosslinker Concentrations FIG. 3 shows tensile tests on DragonSkin™ 30 with different crosslinker concentrations (0.50-1.25 wt %). It shows that higher strain and lower stress at rupture was obtained by low crosslinker concentrations. Increasing crosslinker concentrations resulted in a stiffening effect until a maximum is reached. At higher concentrations the max stress is reduced.

Figure 4:
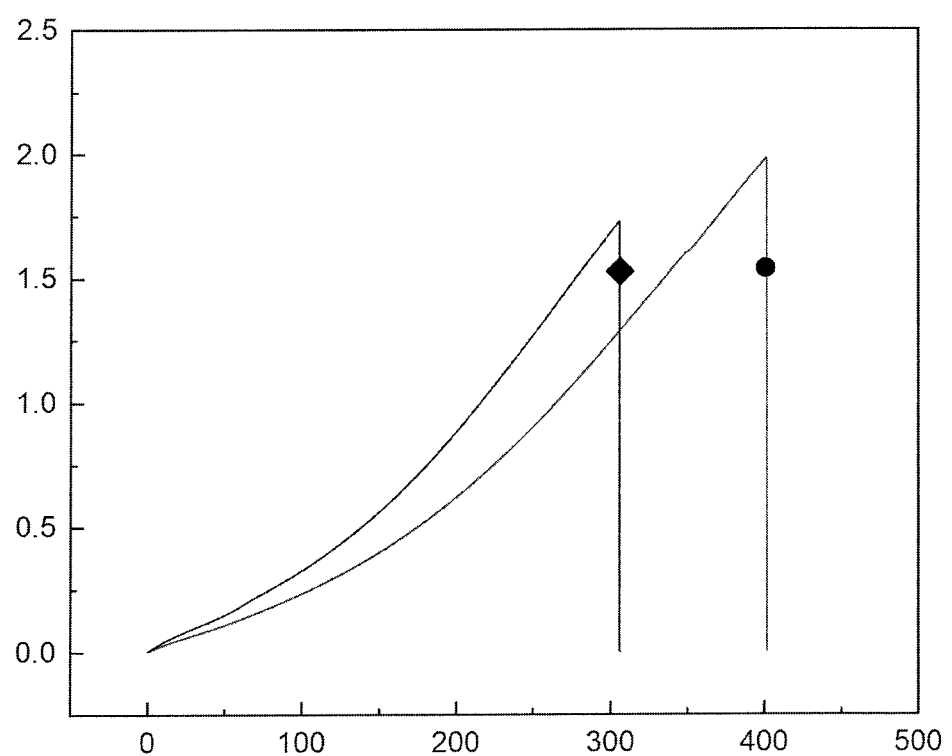
FIG. 4 shows the polysiloxane PlatSil® 73-15 polymerized alone (◆) or as a 9:1 blend with the polysiloxane Q-resin with MPMS (3.25% ●). X-axis represents strain (%), y-axis represents strain (N/mm2).

Example 3: Tuning of Mechanical Properties of Additive Manufacturing Compositions Using Polysiloxane Blends The polysiloxane PlatSil® 73-15 was polymerized alone or as a 9:1-blend with the polysiloxane Q-resin with MPMS (3.25%). FIG. 4 shows that adding Q-resin to PlatSil® 73-15 was able to toughen or increase the stiffness of the cured product. The same stiffening effect was observed when a blend at a ratio from 1 to 9 was used.

Example 4: Optical Properties of Additive Manufacturing Compositions

Figure 5A:
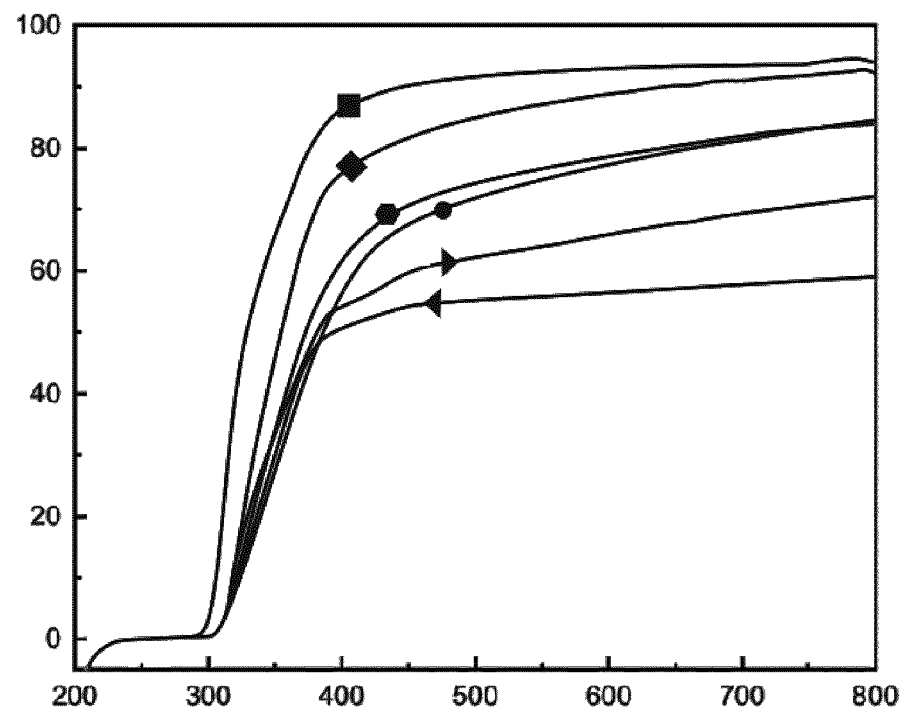
FIG. 5a shows the transmittance of six silicone objects (of thickness 1 mm) obtained by photopolymerization of the invention of the alkenyl-derivatized polysiloxanes (Ecoflex® 00-20 (●), PlatSil® 73-15 (▶), DragnSkin™ 30 (●), Sorta-Clear® 40 (▶), Sylgard® 184 (■), LS-8941 (◆)) with MPMS at concentrations 0.5%, 3.5%, 0.8%, 1.5%, 4.5% and 6.5% respectively.
Figure 5B:
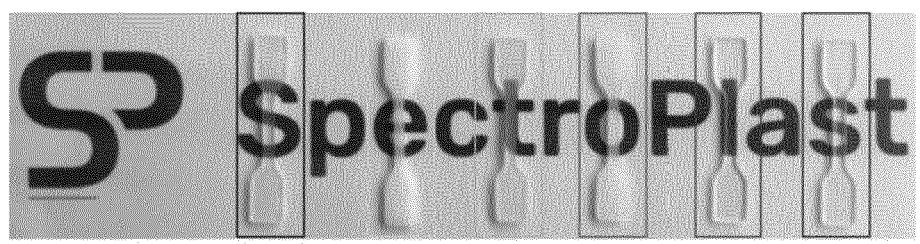
FIG. 5b shows the inline transmittance of the six silicone objects shown in FIG. 5a (from left to right: Ecoflex® 00-20, PlatSil® 73-15, DragoSkirt™ 30, Sorta-Clear® 40, Sylgard® 184, LS-8941). X-axis represents wavelength (nm), y-axis represents transmittance (%).

Six silicone objects (thickness 1 mm) with different transmission properties were prepared by photopolymerization of the alkenyl-derivatized polysiloxanes Ecoflex® 00-20, PlatSil® 73-15, DragoSkin™ 30, Sorta-Clear® 40. Sylgard® 184, LS-8941 with MPMS (0.5%, 3.5%, 0.8%, 1.5%, 4.5% and 6.5% respectively) 0.5% 1-hydroxycyclohexyl phenyl ketone and 0.05% bis(4-methoxybenzoyl)diethylgermanium and polymerized under exposure to UV light for 30 s according to the invention. FIG. 5b shows the inline transmittance of the six silicone objects shown in FIG. 5a (from left to right: Ecoflex® 00-20, PlatSil® 73-15, DragoSkin™ 30. Sorta-Clear® 40. Sylgard® 184, LS-8941). The figures show that the objects have different absorption in the visible light range (380-720 nm). Sylgard® 184 and LS-8941 are the most transparent having about 90% transmission, while PlatSil® 73-15 and Sorta-Clear 40 are translucent having a transmission of about 50%.

The invention claimed is:

1. An additive manufacturing composition comprising:
at least one alkenyl-derivatized polysiloxane and at least one mercapto-derivatized polysiloxane crosslinking agent of formula (I):
$R^1(R)_2SiO((R^3R^4)SiO)_xSi(R)_2R^2$ (I),
wherein R is independently C(1-12)alkyl, preferably methyl;
$R^1, R^2, R^3, R^4$ are independently C(1-12)alkyl, preferably methyl, or mercapto-C(1-12)alkyl;
x is 1 or more;
with the proviso that at least one of $R^1$, $R^2$, $R^3$, $R^4$ is mercapto-C(1-12)alkyl, and wherein the alkenyl-derivatized polysiloxane and the mercapto-derivatized polysiloxane crosslinking agent form a stable emulsion;
wherein the alkenyl-derivatized polysiloxane forms a continuous phase of the emulsion and the mercapto-derivatized polysiloxane crosslinking agent forms a discontinuous phase, wherein the discontinuous phase is present as droplets having a diameter of no more than 100 micrometers.

2. The additive manufacturing composition of claim 1 further comprising at least one photoinitiator.

3. The additive manufacturing composition of claim 1 which is curable by UV-visible radiation.

4. The additive manufacturing composition of claim 1 wherein the at least one alkenyl-derivatized polysiloxane is one polysiloxane or a blend of two or more polysiloxanes.

5. The additive manufacturing composition of claim 1 wherein the at least one alkenyl-derivatized polysiloxane is selected from alkenyl-derivatized poly(dimethylsiloxane), alkenyl-derivatized poly(diphenylsiloxane), alkenyl-derivatized poly(methylphenylsiloxane), alkenyl-derivatized poly(dimethyldiphenylsiloxane), preferably Ecoflex® 00-15, Ecoflex® 00-20, Dragon Skin™ 30, Sorta-Clear® 40 (KauPo, DE), PlatSil® 73-15 (Mouldlife, GB), Sylgard® 184 (Sigma-Aldrich, CH), Zhermack 00 Zhermack 08, Zhermack 13 (Zhermack, DE), LS-8941 (NuSil, USA), KE-2061 (Shin-Etsu Chemical, JP), Vinyl Q-resin dispersion in vinyl terminated polydimethylsiloxane (Gelest Inc., DE).

6. The additive manufacturing composition of claim 1 wherein the alkenyl group in the at least one alkenyl-derivatized polysiloxane is a vinyl, allyl, butenyl or pentenyl group, preferably a vinyl group.

7. The additive manufacturing composition of claim 1 wherein mercapto-C(1-12)alkyl is mercapto-C(1-6)alkyl, preferably mercapto-methyl, mercapto-ethyl, mercapto-butyl, mercapto-propyl.

8. The additive manufacturing composition of claim 1 wherein the at least one mercapto-derivatized polysiloxane crosslinking agent is of formula (I) wherein R, $R^1$, $R^2$, $R^4$ are independently C(1-12)alkyl, preferably methyl; $R^3$ is independently mercapto-C(1-12)alkyl; x is 1 or more.

9. The additive manufacturing composition of claim 1 wherein the at least one mercapto-derivatized polysiloxane crosslinking agent is of formula (I) wherein R, $R^1$, $R^2$ are independently C (1-12)alkyl, preferably methyl; $R^3$, $R^4$ are independently mercapto-C(1-12)alkyl; x is 1 or more.

10. The additive manufacturing composition of claim 1 wherein x is 1 to 100,000.

11. The additive manufacturing composition of claim 1 wherein the at least one mercapto-derivatized polysiloxane is (mercaptopropyl)methylsiloxane homopolymer having 1 or more mercaptopropyl units.

12. The additive manufacturing composition of claim 1 having a viscosity of 100 Pa*s or below.

13. Use of the additive manufacturing composition of claim 1 for forming a 3-dimensional object using one of stereolithography, laser based stereolithography (SLA) and digital light processing (DLP), material jetting, drop on demand, volumetric 3D printing, holographic laser 3D printing, material extrusion, fused deposition modeling, and DLP in a top-down orientation.

14. A method of preparing an additive manufacturing composition according to claim 1 comprising the steps of combining the at least one alkenyl-derivatized polysiloxane and at least one mercapto-derivatized polysiloxane crosslinking agent of formula (I) under shearing to obtain the composition in form of an emulsion.

15. A cured composition prepared from the additive manufacturing composition of claim 1.

16. The cured composition of claim 15 having a transparency of >80%.

17. A method of preparing a cured composition, in particular a 3D printed silicone, the method comprising:
a) preparing a 3D model of a preproduct;
b) additive manufacturing of the preproduct according to the 3D model of the preproduct using an additive manufacturing composition according to claim 1 and an additive manufacturing device;
c) curing the preproduct thereby providing the cured composition.

18. The method according to claim 17, wherein the additive manufacturing device comprises a radiation source for irradiating at least a portion of the additive manufacturing composition.

19. The method according to claim 18, wherein in step b) additive manufacturing is performed by light polymerization, wherein additive manufacturing is performed by VAT photopolymerization, volumetric 3D printing or holographic laser 3D printing.

20. The method according to claim 17, wherein the additive manufacturing device comprises a chamber containing the additive manufacturing composition and a platform within the chamber which is moved in the z-direction during step b).

21. The method according to claim 20, wherein in step a) the 3D model of the preproduct is prepared such that the stability of the preproduct is maximized.

22. The method according to claim 20, wherein in step a) the center of mass of the preproduct is determined and that the 3D model of the preproduct is prepared such that a distance between the center of mass of the preproduct and the platform is minimized.

23. The method according to claim 20, wherein in step a), the 3D model of the preproduct is prepared such that the surface area of the preproduct being in contact with the platform and/or the projected surface area from the preproduct to the build platform is maximized.

24. The method according to claim 18, wherein the additive manufacturing device comprises a recoater and wherein step b) comprises the steps:
  i) dipping the platform into the additive manufacturing composition at a predefined height;
  ii) moving the platform such that at least the applied layer of additive manufacturing composition is above the additive manufacturing composition;
  iii) providing a film of the additive manufacturing composition with a predefined thickness by wiping the applied layer of the additive manufacturing composition with the recoater;
  iv) irradiating the applied film of the additive manufacturing composition with the radiation source;
  v) moving the platform in the z-direction;
  vi) repeating steps ii), iii) iv) and/or v).

25. The method according to claim 24, wherein the radiation source is moved into a predefined focal distance before step iv).

26. The method according to claim 24, wherein in step iv) illuminating the applied film is performed for more than 1 ms.

27. The method according to claim 17, wherein the additive manufacturing device comprises a sealable housing and wherein the housing is free of oxygen and filled or pressurized with an inert gas.

28. The method according to claim 17, wherein the additive manufacturing composition is maintained at a predefined printing temperature during step b).

29. The method according to claim 18, wherein the intensity of irradiation is reduced by 0-99%.

30. The method according to claim 29, wherein the intensity is reduced by digitally changing the grey scale of the projector and/or by providing a physical filter between the radiation source and additive manufacturing composition.

31. The method according to claim 17, wherein in step c) curing comprises prewashing the preproduct, preferably with a solvent, and/or post-curing under UV irradiation and/or swelling the preproduct with a solvent, preferably an alkane, and/or drying the preproduct at a curing temperature.

32. A cured composition prepared by the method according to claim 17.

33. An additive manufacturing composition according to claim 8, wherein x is 1 to 10,000,000.

34. An additive manufacturing composition according to claim 9, wherein x is 1 to 10,000,000.

35. An additive manufacturing composition according to claim 11, wherein the at least one mercapto-derivatized polysiloxane is (mercaptopropyl)methylsiloxane homopolymer having 2 to 100,000 mercaptopropyl units.

36. The cured composition of claim 16 having a transparency of >90%.

37. The method according to claim 26, wherein in step iv) illuminating the applied film is performed for more than 50 ms.

* * * * *